Figure 1:
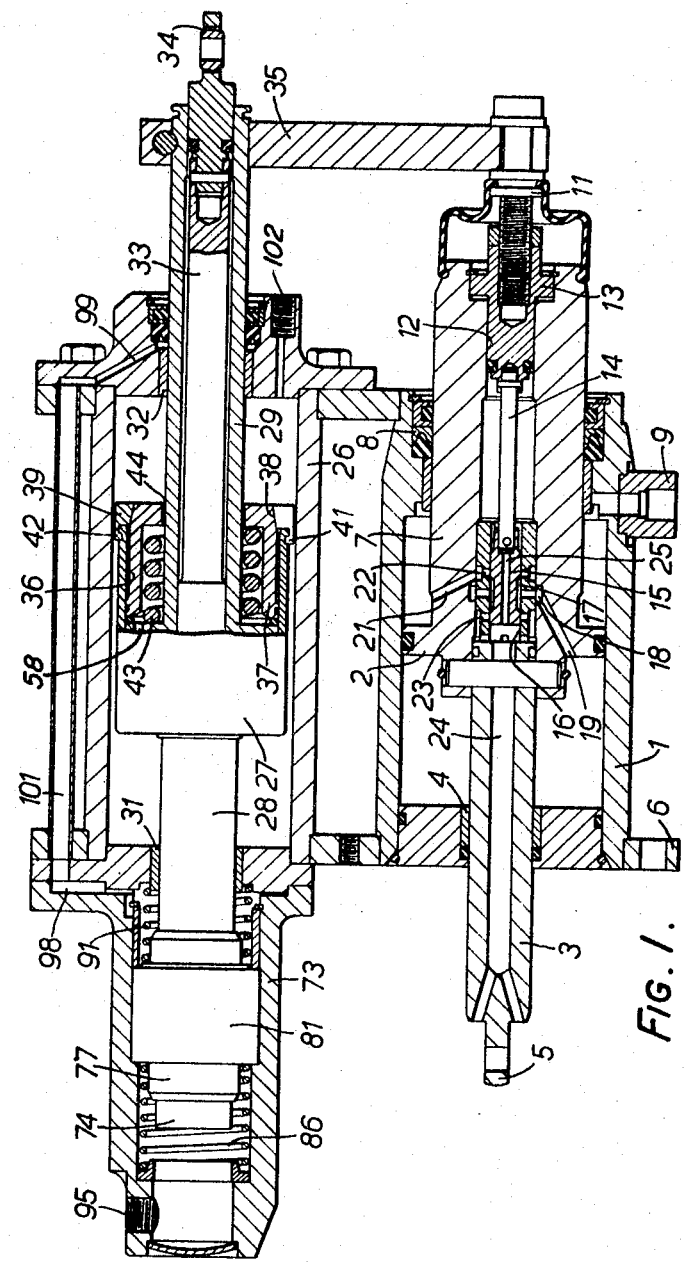

United States Patent Office 3,318,426
Patented May 9, 1967

---

3,318,426
HYDRAULICALLY OPERATED FRICTION ROD BRAKE
David John Barden Forster, Cheltenham, England, assignor to Dowty Hydraulic Units Limited, Gloucester, England, a British company
Filed Mar. 24, 1965, Ser. No. 442,460
Claims priority, application Great Britain, Apr. 10, 1964, 14,950/64
18 Claims. (Cl. 192—8)

This invention relates to hydraulic apparatus and more particularly to a hydraulically-controlled link for transmitting movement from a control member such as a manual lever to a controlled member. More particularly although not exclusively the invention is intended to provide a link between a manual control lever and the pilot valve of a servo motor which adjusts the speed ratio of a hydrostatic power transmission.

The present invention comprises a controlled member slidable along a guide, a control member through which force may be transmitted to the controlled member to move it along the guide, friction pad means carried by the controlled member, spring means to urge the friction pad means into frictional engagement with the guide, a piston and cylinder unit operatively connected with the spring means, and valve means responsive to force exerted by the control member on the controlled member to adjust pressure in the piston and cylinder unit to remove at least a substantial part of the force exerted by the spring means on the friction pad means.

A pair of stops on the controlled member may be provided for alternative engagement by the control member with lost motion when it transmits force in one direction or the other to the controlled member and a centering spring may be provided such that force exerted on the control member to move it to either stop operates the valve means to remove spring load from the friction pad means and such that in the absence of force exerted on the control member the centering spring will move it to the centre portion of the lost motion.

A restrictor may be connected effectively between either end of the cylinder in the piston and cylinder unit and the valve means comprise a simple vent valve opened by movement of the control member to engage either stop to provide a flow path through the restrictor from a pressure source, the pressure drop between the ends of the restrictor then acting to produce a force on the piston to remove at least a substantial part of the force exerted by the spring means on the friction pad means.

For further movement control of the controlled member there may be provided a rod extending from the controlled member, a fixed sleeve within which the rod is slidable, a moving sleeve between the rod and the fixed sleeve, a caged spring acting between the fixed sleeve and the moving sleeve to tend to restore the moving sleeve to a predetermined position relative to the fixed sleeve, and at least one locking member such as a ball radially slidable in a hole in the moving sleeve to engage a recess in either the fixed sleeve or the rod, the arrangement being such that the locking member may be held by the fixed sleeve in the recess in the rod to operate the valve means so that the caged spring may urge the rod towards a predetermined position or so that the rod may hold the locking member in a recess in the fixed sleeve so that the moving sleeve can exert no substantial axial force on the rod.

The valve means may then include a first valve responsive to movement of the control member to engage a stop and a second valve parallel connected with the first valve and operable on entry of the locking member into the recess on the rod.

Figure 2:
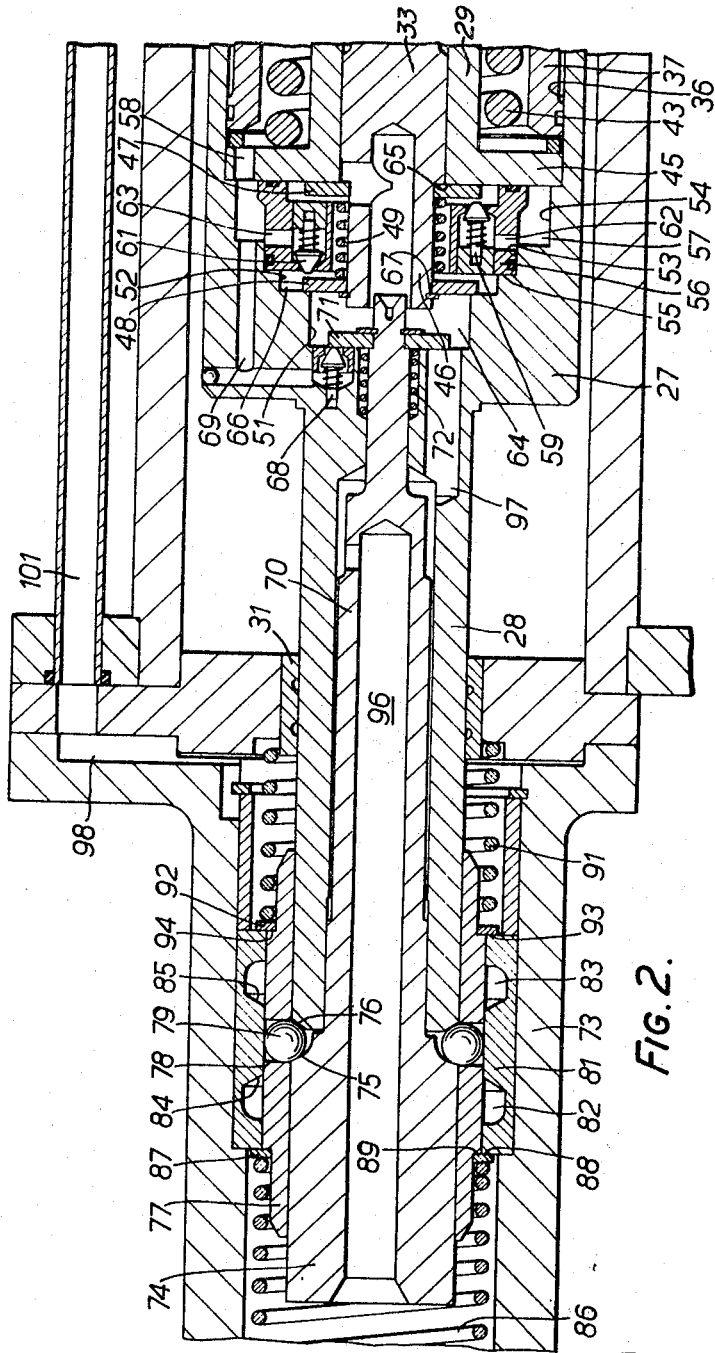

One embodiment of the invention will now be particularly described with reference to the accompanying drawing wherein FIGURE 1 is a part cross-sectional view of the embodiment, and FIGURE 2 is a cross-sectional view of the upper left-hand section of the embodiment as seen in FIGURE 1, but on a larger scale. The embodiment of the invention is intended for control of a servo motor which in turn is intended to control the speed ratio of a hydrostatic power transmission. In the drawing the servo motor is of a conventional kind comprised by a cylinder 1 and a piston 2 slidable within the cylinder. From the piston 2 a small diameter connecting rod 3 extends through a suitably sealed bearing 4 at the left hand end of the cylinder 1 and terminates in a connector 5 for connection to adjust the speed ratio of the hydrostatic power transmission. A flange 6 at the end of the cylinder 1 is arranged to be bolted to the casing of the transmission. A plunger 7 extends from the piston 2 to the right through a suitably sealed bearing 8 in the other end of the cylinder 1. The plunger 7 is very much larger in cross section than the rod 3. A liquid pressure connection 9 is arranged to supply pressure liquid directly to the right hand end of the cylinder 1 to act over the annular area of the piston 2 formed by the difference between the outer diameter of the piston and the diameter of the plunger 7. At its outer end the plunger 7 carries a pilot valve control 11 which is slidably mounted in a bore 12 in the plunger. A flange 13 on the control 11 is mounted within the plunger 7 for a small amount of relative movement only within the plunger 7. From the control 11 a rod 14 extends to a pilot spool valve member 15 which is axially slidable in a valve bore 16. The spool valve member 15 includes a waisted portion 17 which over the range of movement of the valve member 15 in the bore 16 will always make connection with a port 18 connected through passage 19 within the left hand side of the piston 2. A passage 21 in the plunger extends from and adjacent to the right hand side of piston 2 through a port 22 in the bore 16. A further port 23 in the bore 16 connects through an axial passage 24 in the piston rod 3 to the interior of the transmission casing which is normally maintained as a low pressure reservoir. A passage 25 extending axially through the valve member 15 ensures that the space in the bore 12 at the right hand end of this valve is at the same pressure as the passage 25.

For operation of the servo motor the control 11 will be moved in one direction or the other. Suppose, for example, the control is moved to the left as seen in the drawing. The waisted portion 17 will then connect ports 18 and 23 together which will thus vent the left hand end of the cylinder 1 through passage 24 into the transmission casing. The high pressure which permanently acts on the right hand side of the piston 2 will then urge the piston 2 to the left until such time as the control 11 is held in a particular position. Slight further movement of the piston 2 will then move the bore 16 over the valve member 15 so that the waisted portion 17 is completely closed from the ports 22 and 23. If the control 11 is moved to the right, the ports 18 and 22 are connected together so that high pressure liquid is supplied through passages 21 and 19 to the left hand end of the cylinder 1 causing movement of the piston 2 to the right. Such movement will continue until the control is held in a particular position at which slight further movement of the piston 2 will move the bore 16 over the valve member 15 so that the waisted portion 17 connects to neither of the ports 22 and 23.

This servo motor is arranged as far as possible so that no force which can normally be exerted on the piston rod 3 can react on the control 11 when the waisted portion 17 of the valve member 15 does not connect to either of the ports 22 or 23. Operational conditions within the transmission casing may cause low pressure variations within the casing which can react to produce a small endwise thrust on the control 11. Such endwise thrust unless the control 11 is adequately held could cause undesired movement of the servo piston 2. The illustrated locking apparatus is intended to resist such endwise thrust and to transmit controlling movement to control 11.

The locking apparatus is based on a guide in the form of a hollow cylinder 26 fixedly mounted by the side of the cylinder 1. Within the cylinder 26 is located a cylindrical body member 27 slightly smaller in diameter than the cylinder 26 and from which a pair of coaxial tubular members 28 and 29 extend oppositely through suitably sealed bearings 31 and 32 in the two ends of the cylinder. The body 27 and the tubular members 28 and 29 together form the controlled member. Through the central bore of the tubular member 29 a rod 33 extends into the body member 27. Externally rod 33 is formed with a connector 34 for attachment to a manual control lever. The rod 33 forms the control member. A bar 35 is fixedly secured between the outer end of the tubular member 29 and the control 11 so that the control 11 can move only on movement of the controlled member.

A cylindrical bore 36 is formed in the body member to open at one end thereof, the bore being coaxial with the cylinder 26. A hollow piston 37 is slidably mounted in the bore 36, its outer end 38 being of tapered form. An annular friction member 39 is secured to the end of the body member 27 for engagement by the tapered portion 38 of the piston. This friction member is divided into three segments or pads, each of which includes a hook portion 41 engaging in a peripheral groove 42 formed around the outside of the body member 27. The pads 39 overhang the end of the body member 27 and have inner surfaces for co-operating with the tapered end 38 of the piston so that movement of the piston relatively to the body 27 to the right as shown in the drawing will urge the pads outwardly to frictionally engage the cylinder 26. A compression spring 43 located inside the hollow piston 37 reacts against the piston to urge it to the right relatively to the cylinder bore 36. The spring acts through the tapered portion 38 of the piston to urge the pads 39 radially outwardly to engage the cylinder 26 frictionally to resist any force that might be exerted by the control 11 through the bar 35 on the tubular member 29. The piston 37 slides over the tubular member 29 with a small clearance 44 which serves the function of a hydraulic restrictor for liquid flow into the cylinder 36.

Referring now to FIGURE 2, tubular member 29 terminates in a base 45 fixedly secured within body 27 at the base of cylinder 36. The control member 33 extends through the tubular member 29 and the base 45 to a portion 46 of reduced diameter. A pair of washers 47 and 48 are slidably mounted on this reduced portion 46, a spring 49 being placed between them to urge them apart. Within the body 27 a recess is bored coaxially with cylinder 36 whose diameter increases in four steps indicated respectively at 51, 52, 53 and 54. The shoulder 55 between diameters 52 and 53 forms the seat for an annular insert 56 which at its opposite end engages the flange 45 to isolate between insert 56 and bore 54, a chamber 57 which is connected by a passage 58 with the interior of the cylinder 36. A pair of spring loaded non-return valves 59 and 61 are located in the insert 56, each having a connecting passage, respectively 62 and 63, from the chamber 57. Each of the valves 59 and 61 is spring loaded onto a seat to isolate the chamber 57 from the remainder of the space enclosed by the diameters 51, 52, 53 and 54 which for convenience is shown as chamber 64.

If control member 33 is moved to the left as seen in the drawing a shoulder 65 thereof adjacent to the reduced portion 46 will engage washer 47 and urge it against compression spring 49 to unseat the valve 59 and thus to connect chamber 57 to chamber 64. The washer 48 will then engage the shoulder 66 between diameters 51 and 52. If the control member 33 is moved to the right as seen in the drawing a flange 67 carried at the end of the reduced portion 46 will engage washer 48 to move it against the load of spring 49 to unseat the valve 61 again to make connection between the chambers 54 and 64. During this movement the washer 47 will engage the end surface of flange 45. Thus movement either to the left or to the right of control member 33 will connect the interior of cylinder 36 to the chamber 64.

A further spring loaded return valve 68 is mounted in the body 27 and when opened will connect the chamber 57 through the passages 69 with the chamber 64. A rod 70 slidable within tubular member 28 terminates in a flange 71 which on movement to the left as seen in the drawing will open the vlave 68. A spring 72 normally urges the rod 70 to the right relative to the tubular member 28.

A casing 73 extends from the left hand end of cylinder 26 and completely encloses the left hand end of the tubular member 28 which projects through the bearing sleeve 31. The rod 70 has an integral cylindrical extension 74 located at the end of the tubular member 28. The adjacent ends of portion 74 and tubular member 28 are formed as chamfered edges 75 and 76. A sleeve 77 is slidable over the tubular member 28 and the enlarged portion 74 within the casing 73. A plurality of radial holes 78 in the sleeve 77 each contain a ball 79. A cylindrical insert 81 is secured in the casing 73 around the sleeve 77. This insert includes a pair of spaced grooves 82 and 83. Groove 82 includes a chamfered edge 84 whilst the groove 83 includes a chamfered edge 85. A compression spring 86 within casing 73 acts on a washer 87 to tend to make it engage simultaneously with the end 88 of the insert 81 at the shoulder 89 around the sleeve. A compression spring 91 within the casing 73 acts on a washer 92 to tend to make it engage both the end 93 of the insert 81 and a shoulder 94 formed around the sleeve. The spacing of the ends 88 and 93 of the insert sleeve is the same as the spacing of the shoulders 89 and 94 of the sleeve. In the position shown in the drawing both of the washers 87 and 92 engage both of their respective surfaces and locate the sleeve 77 in a central position which corresponds to the central position of the controlled member comprising the body 27 and tubular members 28 and 29.

A hydraulic connection 95 is formed at the end of the casing 73 (FIGURE 1) and internally of the casing connects through passages 96 and 97 in the tubular member 28 with the chamber 64. Hydraulic pressure is fed into the cylinder 26 through a connector 102 to the right hand end and such pressure has access to both sides of the body member 27 by virtue of the spaces between the adjacent friction pads 39. The connector 95 is connected to a low pressure zone such as a reservoir and it will thus vent the chamber 64 to low pressure. Leakage is collected from the ends of sleeves 31 and 32 by the passages 98 and 99 and is fed into the reservoir pressure connector 95 by passage means which include the pipe 101.

In normal operation when the hydrostatic transmission is maintained at a zero speed ratio the control and controlled members take up the neutral position shown in the drawing. In particular the balls 79 are maintained by the insert 81 such that they engage between the chamfered edges 75 and 76 to hold the washer 71 to the left as shown to depress the non-return valve 68 so that the interior of the cylinder 36 is connected to reservoir. The valve 68 when depressed is arranged to have a far smaller restrictive effect to the flow of liquid through it than is the restrictor 44 so that liquid flowing through the restrictor 44 into the cylinder will substantially lose the major part of its pressure. Thus the pressure inside the cylinder 36 is maintained substantially at reservoir pressure and a pressure differential is created across the piston 37 whereby the pressure in the cylinder 26 acts on piston 37 to urge it into cylinder 36. The available movement is very small; however, a small movement is sufficient to release the radial force exerted by the tapered end 38 of the piston on the pads 39, thus maintaining the controlled member in the unlocked condition. If it is now desired to adjust the transmission to have a very small speed ratio the control member 33 will be displaced by the manual control lever for example to the left as shown in the drawing. Such movement will cause shoulder 65 to engage washer 47 to move it to the left to depress valve 59 and then to engage the insert 56. Since valve 59 is in parallel with the valve 68 no further hydraulic function will occur. The force is then transmitted through the insert 56 to the body 27 and to the tubular member 28. The chamfered edge 76 of member 28 will engage the ball 79 to move sleeve 77 to the left against the compression on spring 86. If the manual control lever is released i.e. force is removed from the control member 33 the spring 86 acting through the sleeve 77 of the ball 79 will urge the controlled member back to the central position as shown in the drawing.

Assume now that a large forward speed ratio is required, the manual control lever will be moved a considerable amount, thus moving the control member 33 to a considerable amount. The initial movement will be as previously described. When the balls 79 come opposite to the chamfered edge 84 of groove 82 they will move outwardly into the groove 82 because of the compression exerted by the spring 72 on the two chamfered surfaces 75 and 76. Such movement will allow slight relative movement of the tubular member 28 and the rod 70 to close valve 68. However this hydraulically has no effect since the valve 59 is open. Further movement will cause the chamfered surface 76 to urge the balls 79 into the groove 82. The depth of the groove 82 and the outer diameter of the tubular member 28 are such that the member 28 can move beyond the balls 79 when they have entered the groove 82. At the point where the balls enter the groove 82 and engage on the outer cylindrical surface of the member 28 the compression of the spring 86 can exert substantially no axial force on the member 28. If when a selected speed ratio is attained the manual force is removed from the control member 33, the spring 49 will move member 33 and washer 47 slightly to the right so that the washer engages the flange 45. The valve 59 will now close, shutting off the flow path from cylinder 26 to the reservoir connection 95. Pressure liquid will enter the cylinder 36 through restrictor 44 to equalise pressures on either side of piston 37. The spring 43 will then act through its tapered portion 38 to urge the friction pads radially outwards to engage the cylinder 26. The controlled member will then be frictionally locked and will thus hold the control 11 of the servo motor at the selected position. Any variation of pressure within the transmission casing which effectively acts within the plunger 7 on the control 11 will not be able to cause movement of the servo motor.

To reduce speed ratio the manual lever is moved to apply a force on control member 33 to the right. This force will move washer 48 against the compression of spring 49 onto valve 61 to open it, thus connecting the interior of cylinder 36 to the reservoir connection 95 and reducing the pressure in this cylinder. Further force will also cause the washer to engage the insert 55 so that the force provided by the control member will then move the controlled member to the right. As the balls 79 come opposite the gap between the chamfered edges 75 and 76, they are urged into the same. This force results from the compression of spring 86 acting through the sleeve 77 to urge the balls against the chamfered edge 84 of groove 82. The strength of the spring 86 is such that the radial inward force produced by urging balls 79 against the edge 84 will urge the balls radially inwards to force the chamfered edges 75 and 76 apart. This action will move the rod 70 within the tubular member 28 to open valve 68. Further movement towards the centre results from the compression spring 86 acting through the sleeve 77 and the balls 89 to urge the tubular member 28 to the right. Reverse speed ratios of the transmission are obtained by moving the control and the controlled members to the right as seen in the drawing. The actions previously described will again take place and in particular the balls will now co-operate with the groove 83 and its chamfered edge 85.

In the described embodiment it has been arranged that liquid pressure is supplied into the cylinder 26 whilst venting to reservoir is effected by tubular member 28 extending into the cylinder from the body member. It is equally within the scope of this invention that the interior of the cylinder 26 can be connected to reservoir and high pressure supplied through the tubular member 28, appropriate modification being made to the piston and cylinder 37 and 36 and spring 43 to enable the piston to respond to effect locking. In the described invention the guide has been illustrated as a hollow cylinder. It is equally within this invention that the guide may take any other form although this might require that the hydraulic supply and reservoir connections in the piston and cylinder unit should be made independently of the guide.

I claim as my invention:

1. In combination, a guide, a controlled member slidable along the guide, a control member through which force may be transmitted to the controlled member to move it along the guide, friction pad means carried by the controlled member, spring means to urge the friction pad means into frictional engagement with the guide, a piston and cylinder unit operatively connected with the spring means, and valve means responsive to force exerted by the control member on the controlled member to adjust pressure in the piston and cylinder unit to remove at least a substantial part of the force exerted by the spring means on the friction pad means.

2. The combination as claimed in claim 1 including a pair of stops on the controlled member alternatively engageable by the control member with lost motion when it transmits force in one or other direction to the controlled member, and a centering spring, the arrangement being such that force exerted on the control member to move it to either stop operates the valve means to remove spring load from the friction pad means and such that in the absence of force exerted on the control member the centering spring will move it to the centre portion of the lost motion.

3. The combination as claimed in claim 2 including a restrictor connected effectively between either side of the piston in the piston and cylinder unit and wherein the valve means comprises a simple vent valve opened by movement of the control member to engage either stop to provide a flow path through the restrictor from a pressure source, the pressure drop between the ends of the restrictor then acting to produce a force on the piston to remove at least a substantial part of the force exerted by the spring means on the friction pad means.

4. The combination as claimed in claim 1 including a rod extending from the controlled member, a fixed sleeve within which the rod is slidable, a moving sleeve between the fixed sleeve and the moving sleeve, a caged spring acting between the fixed sleeve and the moving sleeve to tend to restore the moving sleeve to a predetermined position relative to the fixed sleeve, and at least one locking member such as a ball radially slidable in a hole in the moving sleeve to engage a recess in the fixed sleeve or in the rod, the arrangement being such that the locking member may be held by the fixed sleeve in the recess in the rod to operate the valve means so that the caged spring may urge the rod towards a predetermined position or so that the rod may hold the locking member in the recess in the fixed sleeve so that the moving sleeve can exert no axial force on the rod.

5. The combination as claimed in claim 4 wherein the valve means includes a first valve responsive to movement of the control member to engage a stop, and a second valve parallel connected with the first valve operable on entry of the locking member into the recess in the rod.

6. The combination as claimed in claim 5 wherein the rod comprises two longitudinally extending parts, of which one part is movable relatively to the other when the locking member enters the recess in the rod, such relative movement being arranged to open the second valve.

7. The combination as claimed in claim 1 wherein the guide comprises a fixed cylinder within which a part of the controlled member is located, this part comprising the piston and cylinder unit, the friction pad means, and the spring means, the spring means being arranged to urge the friction pad means radially to grip the fixed cylinder.

8. The combination as claimed in claim 7 in which the piston and cylinder unit is coaxial with the fixed cylinder, the piston including a taper portion to urge the friction pad means radially by cam action.

9. The combination as claimed in claim 7 in which the interior of the cylinder is adapted for connection to a supply of liquid at pressure and in which extensions of the controlled member of equal diameter extend through seals in opposite ends of the fixed cylinder, the valve means controlling liquid flow to the low pressure zone from the piston and cylinder unit.

10. The combination as claimed in claim 9 in which one extension is hollow and the control member extends longitudinally through it to the valve means which are mounted on a part of the controlled member within the fixed cylinder.

11. The combination as claimed in claim 9 in which the other extension is hollow and provides a flow path to carry liquid at pressure from the piston and cylinder to a low pressure zone.

12. In combination, a guide (26), a controlled member (27–29) slidable in the guide and having a friction member (39) thereon which is biased to frictionally engage with the guide so that the controlled member can be locked in position in the guide, a first bias reduction means (68, 71, etc.) operable to relieve the bias on the friction member so long as the controlled member occupies one of a limited range of positions in the guide, a control member (33) which is responsive to an applied force to cause the controlled member to undergo sliding movement in the guide, a second bias reduction means (59 or 61, 47 or 48, etc.) operable to relieve the bias on the friction member so long as the force is applied to the control member, and disabling means (76, 82 or 83, etc., and 49) operable to deactivate the first bias reduction means (thru 82 or 83, etc.) after the controlled member has traveled to a position outside said range, and to deactivate the second bias reduction means (thru 49) after the force is discontinued, so that the bias on the friction member operates to lock the controlled member in any position outside said range at which the force is discontinued.

13. The combination according to claim 12 wherein the friction member is controlled by a hydraulically operated piston, the opposite sides of which are hydraulically interconnected through a restrictor, there being a source of pressurized fluid connected to the hydraulic system on that side of the piston opposed to the bias, and a vent valve connected to the hydraulic system on that side of the piston coincident with the bias, to vent the fluid to a low pressure zone and thus create a pressure differential across the piston in opposition to the bias, when open, said control member being operable to open the vent valve in response to the application of said force, and to maintain the valve in open condition so long as the force is applied thereto.

14. The combination according to claim 13 wherein the controlled member has a pair of stops thereon, and said control member is movable from a centered position between the stops to abut one or the other of the stops following a period of lost motion, and operable to open the vent valve during such period, and to maintain the valve in open condition so long as the force is applied thereto.

15. The combination according to claim 12 wherein the friction member is controlled by a hydraulically operated piston, the opposite sides of which are hydraulically interconnected through a restrictor, there being a source of pressurized fluid connected to the hydraulic system on that side of the piston opposed to the bias, and a vent valve connected to the hydraulic system on that side of the piston coincident with the bias, to vent the fluid to a low pressure zone and thus create a pressure differential across the piston in opposition to the bias, when open, said disabling means being operable to close the vent valve after the controlled member has traveled to a position outside said range in the guide, and to maintain the vent valve in closed condition so long as the controlled member remains in a position outside said range.

16. The combination according to claim 15 wherein the controlled member has a pair of relatively reciprocable parts which are yieldably biased to engage one another and operable to close the vent valve in response to such reciprocation, there being a locking member interposed between the parts to space them apart from one another so long as the controlled member remains in a position within said range, and said disabling means being operable to displace the locking member from between the parts, after the controlled member has traveled to a position outside said range, and to maintain the locking member in a relatively displaced condition so long as the controlled member remains in a position outside said range.

17. The combination according to claim 12 wherein the controlled member is yieldably biased to assume a neutrol position within said range, and the control member is operable to disable the bias on the controlled member after the controlled member has traveled to a position outside said range.

18. The combination according to claim 17 wherein the controlled member has a pair of relatively slidable parts which are detachably interlocked to undergo conjoint sliding movement, there being resilient means connected with one of the parts to urge the controlled member into its neutral position, and said control member is operable to detach the other part from said one part, after said controlled member has traveled to a position outside of said range.

References Cited by the Examiner

UNITED STATES PATENTS

| | | | |
|---|---|---|---|
| 2,332,763 | 10/1943 | Stewart | 118—86 X |
| 2,633,213 | 3/1953 | Houplain | 192—8 |
| 3,203,513 | 8/1965 | Allen | 188—67 X |
| 3,228,632 | 1/1966 | Hunth | 192—8 X |

BENJAMIN W. WYCHE, III, *Primary Examiner.*